Feb. 27, 1968     P. R. EKLUND     3,370,899
COMBINATION THRUST AND RADIAL BALL BEARING
Filed June 15, 1966
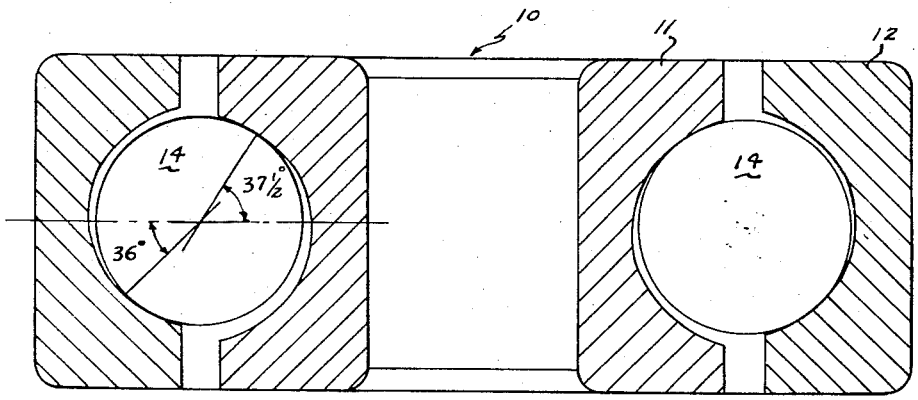
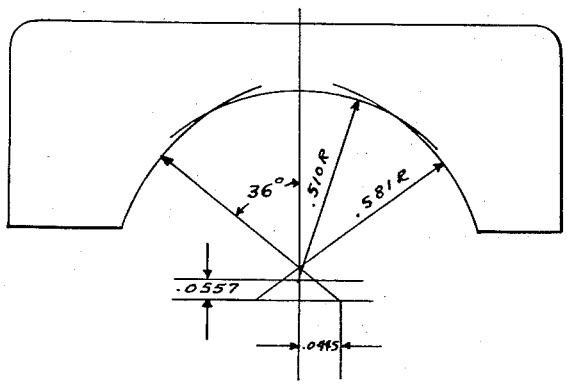
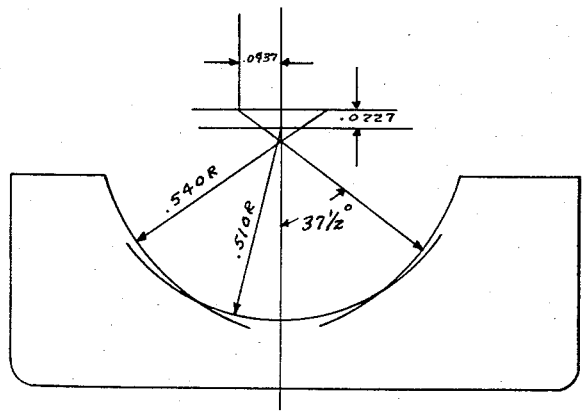
INVENTOR.
PHILLIP R. EKLUND
BY *Harry A. Herbert Jr.*
ATTORNEY
*Richard J. Killoren*
AGENT United States Patent Office 3,370,899
Patented Feb. 27, 1968

3,370,899
COMBINATION THRUST AND RADIAL
BALL BEARING
Phillip R. Eklund, R.R. 4, Agerter Road,
Lima, Ohio 45806
Filed June 15, 1966, Ser. No. 559,042
2 Claims. (Cl. 308—193)

The invention described herein may be manufactured and used by or for the United States Government for governmental purposes without the payment to me of any royalty thereon.

The invention relates to a combination thrust and radial ball bearing having noncircular grooves in the inner and outer races.

One object of the invention is to provide a combination thrust and radial ball bearing which will take greater combination radial and thrust loads in a single unit than prior art devices.

Another object of the invention is to provide a combination thrust and radial ball bearing which will have less tendency for ball windup than prior art devices.

These and other objects will be more clearly understood from the following detailed description taken with the drawing, wherein:

FIG. 1 is a sectional view of a combined radial and thrust bearing according to the invention;

FIG. 2 is an enlarged schematic view of a portion of the outer race for the device of FIG. 1; and FIG. 3 is an enlarged schematic view of a portion of the inner race for the device of FIG. 1.

In prior art combination thrust and radial ball bearings, using noncircular grooves, such as described in the article in "Lubrication Engineering," vol. 14, No. 4, April 1958, pages 153–158 and shown in Fig. 8 of that article, the contact angle on the inner and outer races are the same. When any misaligment occurs in this type of device, ball windup tends to occur ad the balls may become wedged between the contacting surfaces which in some cases may cause the bearing to lock.

According to this invention, the contact angle of the inner race is made 1° to 5° greater than the contact angle of the outer race. It has been found that this will substantially eliminate ball windup.

Reference is now made to FIG. 1 of the drawing, which shows a ball bearing 10 having an inner race 11 and an outer race 12 with a plurality of bearing balls 14 therebetween. The contact angle of the inner race is made from 1° to 5° greater than the contact angle of the outer race. The angles and spacings as shown are exaggerated to better illustrate the invention.

The exact radius of curvature and centers of curvature would be determined by the particular conformity and radial and axial clearances chosen for the particular design. With the device shown, the outer race has a contact angle of 36° and the inner race has a contact angle of 37½°. It is to be understood that other contact angles could be used as long as the contact angle of the inner race is made from 1° to 5° greater than the contact angle of the outer race. These contact angles and other dimensions are designed into the bearings in the usual manner well known in the art.

There is thus provided a combination thrust and radial ball bearing which will have less tendency for ball windup and which will take greater combination radial and thrust loads than prior art devices.

While a certain specific embodiment has been described, it is obvious that numerous changes may be made without departing from the general principles and scope of the invention.

I claim:

1. A combination thrust and radial ball bearing, comprising: an inner race; an outer race; a plurality of rolling ball members between said inner and outer races; said outer race having a noncircular groove with a central portion having a first predetermined radius of curvature and two side portions having a radius of curvature greater than the radius of curvature of said central portion; said side portions being positioned to contact said rolling ball members at a first predetermined contact angle; said inner race having a noncircular groove with a central portion having a first predetermined radius of curvature and two side portions having a radius of curvature greater than the radius of curvature of said central portion; said side portions being positioned to contact said rolling ball members at a second predetermined contact angle; said contact angle of said inner race being from 1° to 5° greater than the contact angle of said outer race.

2. The device as recited in claim 1 wherein the contact angle of said inner race is approximately 1.5° greater than the contact angle of said outer race.

References Cited

FOREIGN PATENTS 542,876  12/1955  Belgium.

MARTIN P. SCHWADRON, Primary Examiner.
FRANK SUSKO, Examiner.